US006802231B1

United States Patent
Wessel

(10) Patent No.: US 6,802,231 B1
(45) Date of Patent: Oct. 12, 2004

(54) CLOSURE MEMBER FOR AN OPENING IN AN ASSEMBLY, SITUATED ON A BICYCLE GEAR BOX

(75) Inventor: Robert Wessel, Würzburg (DE)

(73) Assignee: SRAM Corporation, Chicago, IL (US)

( * ) Notice: Subject to any disclaimer, the term of this patent is extended or adjusted under 35 U.S.C. 154(b) by 0 days.

(21) Appl. No.: 09/744,046

(22) PCT Filed: Apr. 8, 2000

(86) PCT No.: PCT/EP00/03156

§ 371 (c)(1),
(2), (4) Date: Jan. 16, 2001

(87) PCT Pub. No.: WO00/69711

PCT Pub. Date: Nov. 23, 2000

(30) Foreign Application Priority Data

May 14, 1999 (EP) .............................................. 19922327

(51) Int. Cl.[7] .................................................. F16C 1/26
(52) U.S. Cl. ........................ 74/502.4; 74/502.6; 220/834
(58) Field of Search ............................. 74/502.4, 502.6; 49/352; 403/282, 279, 324, 326; 220/834, 835, 836, 840, 213, 833, 831, 837, 838, 847

(56) References Cited

U.S. PATENT DOCUMENTS

| | | | | |
|---|---|---|---|---|
| 1,923,481 A | * | 8/1933 | Ford | 220/484 |
| 2,958,439 A | * | 11/1960 | Yochem | 220/834 |
| 3,874,550 A | * | 4/1975 | Gordon | 220/213 |
| 3,998,354 A | * | 12/1976 | Song | 220/254.7 |
| 4,366,915 A | * | 1/1983 | Seidler | 220/339 |
| 4,391,385 A | * | 7/1983 | Rausing | 220/269 |
| 4,712,707 A | * | 12/1987 | Pavely | 220/234 |
| 4,753,358 A | * | 6/1988 | Virca et al. | 215/230 |
| 4,942,271 A | * | 7/1990 | Corsi et al. | 174/101 |
| 5,062,315 A | * | 11/1991 | Yoshigai | 74/502.2 |
| 5,134,897 A | | 8/1992 | Romano | |
| 5,139,181 A | * | 8/1992 | VerWeyst | 222/480 |
| 5,358,135 A | * | 10/1994 | Robbins et al. | 220/337 |
| 5,367,827 A | * | 11/1994 | Tajima et al. | 49/352 |
| 5,437,206 A | * | 8/1995 | Boor | 74/489 |
| 5,632,440 A | * | 5/1997 | Tragardh et al. | 220/258.2 |
| 5,964,123 A | * | 10/1999 | Arbeiter | 74/489 |

FOREIGN PATENT DOCUMENTS

DE  298 04 998 U1 * 7/1998 ........... B65D/51/00
EP  0878383 A2  11/1998

OTHER PUBLICATIONS

Japanese Patent Abstract No. 09309521 A (Toutarou), dated Dec. 2, 1997.

* cited by examiner

*Primary Examiner*—David A. Bucci
*Assistant Examiner*—Timothy McAnulty
(74) *Attorney, Agent, or Firm*—Milan Milosevic; Lisa Wunderlich

(57) ABSTRACT

The invention relates to a closure member for an opening in an assembly on a housing for a bicycle gear box. Said closure member, consisting of a rubber elastic material, is captively connected to the housing by an extension and can be swung open and closed in a similar manner to a hinge. The confirmation can be optically improved by the formation of an upper lip.

7 Claims, 1 Drawing Sheet

CLOSURE MEMBER FOR AN OPENING IN AN ASSEMBLY, SITUATED ON A BICYCLE GEAR BOX

BACKGROUND OF THE INVENTION

FIELD OF THE INVENTION

The invention relates to a closure member for an installation opening in a housing of a shift mechanism for bicycles, made of rubber-elastic material, this installation opening preferably being suitable for installing a cable for a Bowden line, which can be pulled out of this installation opening if damage has occurred to the Bowden transmission.

U.S. Pat. No. 5,134,897 has disclosed a twist-grip shift that has a grip with a cable reel onto which a cable for operating a set of bicycle gears can be wound. The cable ends in a nipple that can be fixed in the cable reel, the cable reel moving in a housing that is mounted on the bicycle and has an opening that comes to lie over the nipple in a particular position of the cable reel, allowing the cable to be pulled or pushed nipple first through the opening in the housing. The cable can be reinstalled in the same way that it is removed. The position of the nipple relative to the opening in the housing is shown particularly by FIGS. 3, 6, 8 and 12.

However, there is no covering for the opening in the housing to prevent dirt from penetrating into the sensitive bearing arrangement of the cable reel. On the contrary, the design is such that covering is not possible because the opening simultaneously serves as a window for the figures arranged on the cable reel to indicate the gear selected. In this case, the opening could at best be covered by a transparent sheet.

However, coverings for openings in the housing of a shift mechanism for the installation of a cable together with its nipple are known and are sold in large quantities by the applicant. In the event of cable repair, however, the coverings are quickly lost because of their small size, and they must subsequently be replaced. The subject matter of the invention covered by this application relates to loss-proofing of a closure member that can be used to close this above-mentioned installation opening as many times as desired without being lost or being damaged during installation. This is achieved through the selection of material and the arrangement of the closure member on the housing. Since the closure member does not have to transmit any significant forces or have any significant forces acting on it, it can be made from relatively soft rubber-elastic material and be provided with an extension that can be secured on the housing, the closure member hanging from the housing by means of the extension once opened and remaining available for subsequent closure of the installation opening.

SUMMARY OF THE INVENTION

The invention has thus set itself the object of providing a closure member for an installation opening in a housing of a shift mechanism for bicycles that is made of rubber-elastic material, can be opened as many times as desired and can be closed reliably, a means of preventing loss ensuring that the closure member does not get lost during the installation of the cable.

The way in which this is achieved is disclosed in the characterizing part of the main claim and in the subclaims.

An exemplary embodiment of a closure member for a housing on a shift mechanism is explained with reference to a number of diagrams, where:

DESCRIPTION OF THE PREFERRED EMBODIMENT

Figure 1:
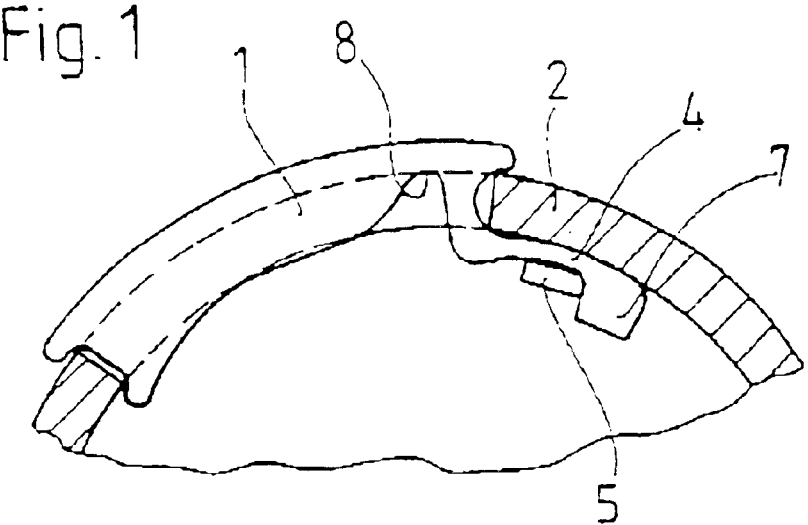
FIG. 1 shows a closure member with an extension in a housing of a shift mechanism in a partially sectioned representation.

If 1 denotes a closure member for a housing 2 of a shift mechanism 3, this closure member is secured in a loss-proof manner in an installation opening 4 by means of an extension 6 inasmuch as the extension 6 is arranged in such a way that it can be inserted behind a holding member 5, the end of the extension 6 comprising a thickened portion 7 that is supported against the housing 2 and the holding member 5 in such a way that the closure member 1 can no longer be pulled out of the anchorage thus formed. The closure member 1 furthermore has an upper lip 9 that runs at least part of the way round on the upper surface of the housing 2 of the shift mechanism 3 and comes to rest over the edge of the installation opening 4 when the closure member 1 has closed the installation opening 4.

FIG. 1 shows how the upper lip 9 seals the installation opening 4 against dirt or water penetration. A lower lip 10, which likewise runs at least part of the way round on the inside of the housing 2 prevents the closure member 1 from opening spontaneously once closed.

Figure 2:
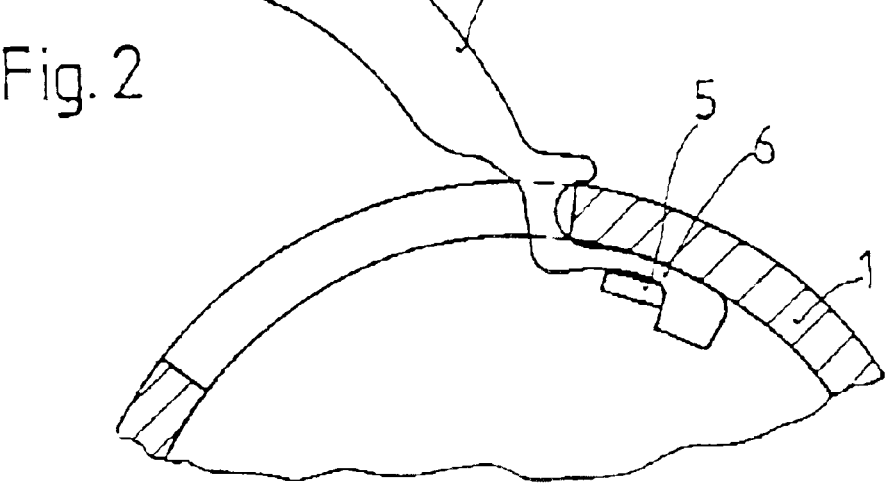
FIG. 2 shows the opened closure member with an upper lip and a lower lip for fixing the closure member on the edge of an installation opening in the housing.

FIG. 2 illustrates how the closure member 1 exposes the installation opening 4 when opened. Here, a molded recess 8 equivalent to a neck is employed and acts like a hinge, the extension 6 together with the thickened portion 7 behind the holding member 5 remaining stationary without being affected by the movement of the closure member.

Figure 3:
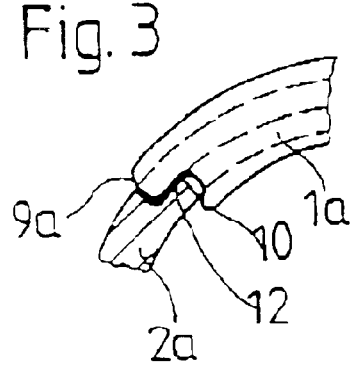
FIG. 3 shows how the edge of the installation opening is formed by an offset.

According to FIG. 3, the edge of the installation opening is modified in such a way that an upper lip 9a comes to rest on an offset 12 in a housing 2a, it being possible to recess a modified closure member 1a at least partially into the installation opening 4 in the closed state, with the result that the upper lip 9a no longer extends beyond the profile of the housing 2a and forms a more elegant means of closure.

Figure 4:
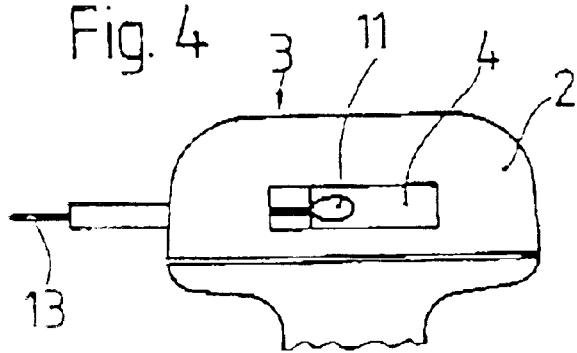
FIG. 4 shows the arrangement of the installation opening on the shift mechanism.

FIG. 4 shows an installation opening which, when a cable 13 is in a particular position, reveals a nipple 11 of the cable 13 when the closure member 1 is open, it being possible either to pull the nipple out through the installation opening 4 with a tool or to push it through the installation opening 4 when the cable 13 is being pushed in from outside the shift mechanism 3.

The closure member 1, 1a can be anchored easily in the housing 2 of the shift mechanism 3 by means of the holding member 5, which can be formed easily by an injection-molding technique, providing the advantage compared with the previous solution of a simple cap that a closure member 1, 1a with a safeguard against loss is obtained. The recessable sealing lip 9a might by mentioned as a further refinement, said lip enhancing the appearance of the housing 2a in the area of the installation opening 4.

I claim:

1. An access panel assembly for a bicycle shift mechanism, comprising:

a housing including an installation opening;

a control cable internally routed within the housing and accessible through the installation opening;

a closure member for covering the installation opening, the closure member made of elastomeric material, the closure member including an extension insertable through the installation opening and attachable to an interior of the housing; and a holding member connecting the extension of the closure member to the housing such that the closure member remains connected to the housing when the installation opening is both covered and uncovered by the closure member, the closure member configured to seal against the housing and not the extension when the closure member covers the installation opening.

2. The access panel assembly as claimed in claim 1, wherein the extension has a thickened portion in position on the holding member under a tensile loading of the closure member.

3. The access panel assembly as claimed in claim 1, wherein the closure member has a molded recess that enables the closure member to act as a hinge.

4. The access panel assembly as claimed in claim 1, wherein the closure member has an upper lip to rest over the edge of the installation opening.

5. The access panel assembly as claimed in claim 1, wherein the closure member has a lower lip at least at a point furthest away from the extension, said lower lip sliding under an edge of the installation opening after the closure of the installation opening by the closure member.

6. The access panel assembly as claimed in claim 1, wherein the closure member has an upper lip and an edge of the installation opening in the housing has an offset on which an upper lip of the closure member is placed such that the closure member is arranged in a recessed manner on the shift mechanism.

7. The access panel assembly as claimed in claim 1, wherein the closure member includes an upper lip and a lower lip disposed at a distal end of the closure member from the extension, the upper and lower lips configured to removably engage an edge of the installation opening.

* * * * *